Nov. 3, 1942.   C. P. O'DELL ET AL   2,300,461
POWER DRIVING DEVICE FOR LAWN MOWERS
Filed July 4, 1939
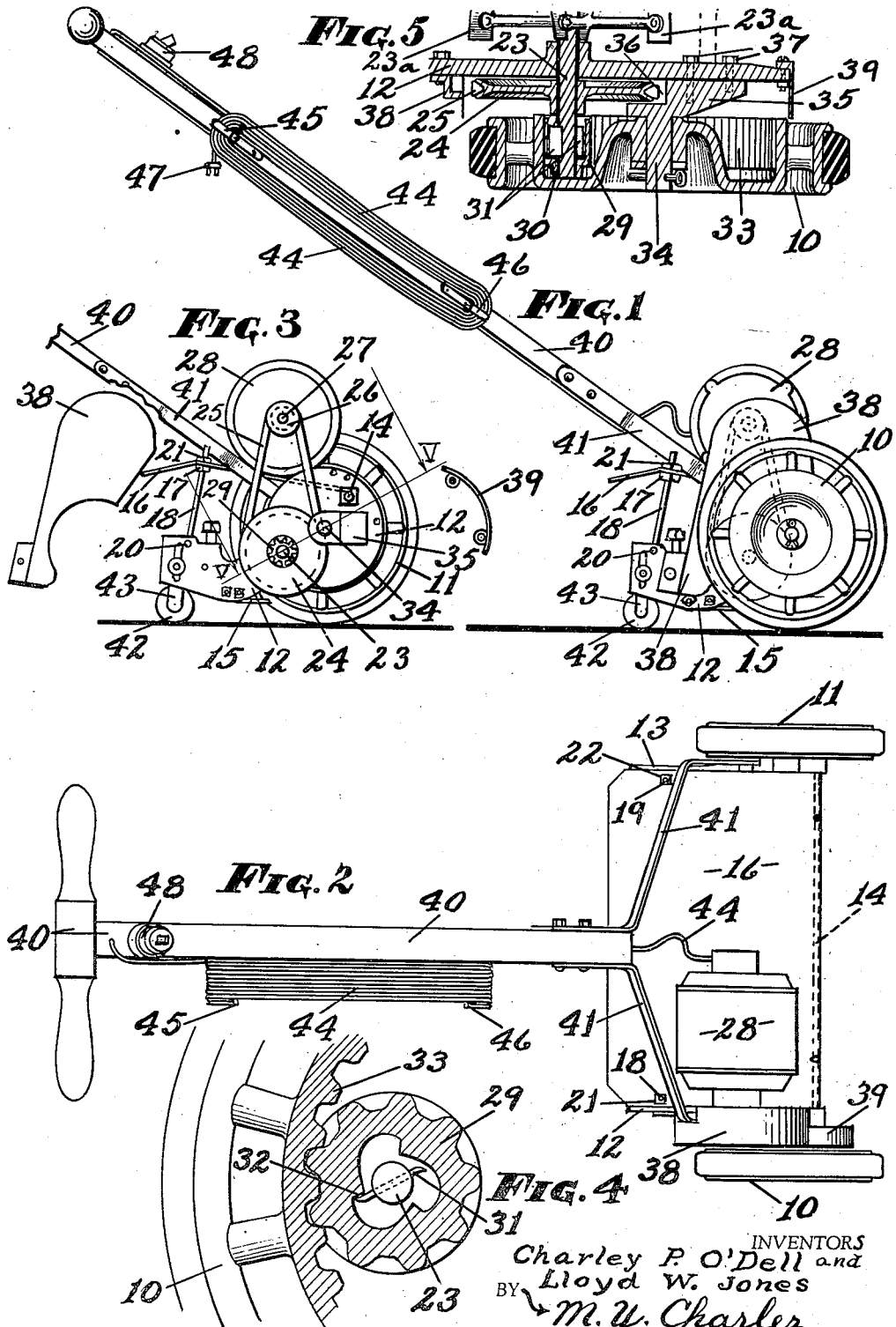
INVENTORS
Charley P. O'Dell and
Lloyd W. Jones
BY M. Y. Charles
ATTORNEY.

Patented Nov. 3, 1942

2,300,461

UNITED STATES PATENT OFFICE 2,300,461

POWER DRIVING DEVICE FOR LAWN MOWERS

Charley P. O'Dell and Lloyd W. Jones, Wichita, Kans.; said Jones assignor to said O'Dell Application July 4, 1939, Serial No. 282,784

1 Claim. (Cl. 56—26)

Our invention relates to an improvement in power driven lawn mowers. The object of our invention is to provide a device that can be applied to standard lawn mowers with a minimum amount of change in the original design of the mower and thereby convert manually driven lawn mowers to power driven lawn mowers.

A further object is to provide a device of the kind mentioned which will drive both the traction wheels and the rotary sickle of the lawn mower, and in addition thereto maintain the relative speed between the sickle and the traction wheels for which the mower was originally designed.

A still further object is to provide a device of the kind mentioned that is cheap to make, easy to install, sturdy in construction, and simple to operate.

In lawn mowers in which the traction wheels drive the rotary sickle there is a pinion on each end of the rotary sickle shaft that mesh with gear teeth on the traction wheels of the mower. These pinions are provided with a ratchet mechanism such that they will only drive the rotary sickle in the proper direction for the cutting process which it performs; and the sickle of course is driven at the proper relative speed to that of the traction wheels so that if the operator of the mower pushes the mower fast, the sickle will run faster than it would if the mower was pushed slow. Now this same relative speed of the sickle to that of the traction wheels must be maintained if the mower is to be power driven; therefore it is a further object of our invention to provide a power driving mechanism for a lawn mower that will maintain the same relative speed between the sickle and the traction wheels as was originally designed for the mower. These and other objects will be more fully described as this description progresses.

Now referring to the accompanying drawing:

Fig. 1 is a side view of a lawn mower to which our invention has been applied.

Fig. 2 is a top plan view of the lawn mower to which our invention has been applied.

Fig. 3 is a side view of the lawn mower to which our invention has been applied, the traction wheel and drive housings being removed therefrom for convenience of illustration.

Fig. 4 is an enlarged detail vertical sectional view through the pinion and ratchet device that drives the sickle and traction wheel.

Fig. 5 is an enlarged detail sectional view of the right hand side of the machine, the view being taken on the line V—V in Fig. 3 and looking in the direction of the arrows.

Similar numerals of reference designate the same part throughout the several figures of the drawing.

In the drawing is shown an ordinary lawn mower having a pair of traction wheels 10 and 11, a pair of frame members 12 and 13 which are joined together by a rod 14 and knife support 15.

Our invention consists of a plate 16 the front edge of which is attached to the rod 14 and the rear portion of which is supported at either side on nuts 17 that are threaded on the upper ends of a pair of shafts 18 and 19, the lower ends of which are turned to a right angle and passed through holes in the frame members 12 and 13 at a point such as 20 so that by screwing the nuts 17 up or down on the rods 18 and 19 the plate 16 may be rocked up or down for purposes that will later be described. At 21 and 22 are nuts on the rods 18 and 19 that screw against the plate 16 so as to clamp the plate 16 between the nuts 17 and 21, and 17 and 22, as a means of locking the plate 16 in its adjusted position.

The rear end of the plate 16 is bent downwardly so as to form a guide to direct the grass that has been cut by the sickle and is being thrown rearwardly into a grass catcher, (not shown), that may be attached to the lawn mower in the usual manner as will be readily understood.

In manufacturing the lawn mower one end of the rotary sickle shaft 23 is made a little longer than usual, and on the shaft 23 and between the frame member 12 and the wheel 10 is rigidly mounted a pulley 24 that is designed to receive a V-shaped drive belt 25 which is driven by a smaller pulley 26 that is rigidly mounted on the rotatably driven shaft 27 of an electric motor 28 that is rigidly mounted on the plate 16.

On the outer ends of the shaft 23 are mounted drive pinions such as 29, having a ratchet or notched shape recess therein that will slip over the shaft 23, and the outer ends of the pinions 29 are provided with bearings 30 that are rotatably mounted on the shaft 23. At 31 is a dog or plate that is slidably mounted in a slot through the shaft 23 in such a manner that the dog 31 will catch on the shoulders 32 of the notched recess in the pinions 29 so as to drive the pinions 29 when the shaft 23 is driven in a clock-wise direction as shown in Fig. 4. The pinions 29 being in mesh with the cogs 33 in the wheels 10 and 11 will obviously drive the wheels 10 and 11 of the lawn mower when the motor 28 is running.

Due to the high speed with which most electric motors run, it is necessary that the V-pulley 24 be of considerable size in order to reduce the speed with which the traction wheels 10 and 11 are run to a point where it will be easy for a person to walk behind the mower and keep up with it, so that the person may guide the mower to make it go where he desires.

In putting a pulley 24 of the proper size on the machine, it was found that the pulley 24 was so large in diameter that the axle 34 on which the traction wheel 10 is mounted was in the way of the pulley 24, therefore arrangements had to be made to remove the axle 34 from the space to be occupied by the pulley 24; yet it was necessary that the axle 34 be maintained in its original axial position in order that the wheel 10 would support and carry the machine in its original position. This is accomplished by providing a bracket 35 having a notch 36 therein which provides room in which the pulley 24 may run and the axle 34 is integrally formed on or may be riveted to the bracket 35, which is bolted to the frame member 12 by means of bolts 37 in such a position that the axle 24, is in its original axial position on the machine.

This arrangement sets the wheel 10 a little further away from the frame member 12 than it was before the power driving device was applied to the machine, however attention is called to the fact that the entire power transmission mechanism is contained in a very narrow space intermediate the frame member 12 and the traction wheel 10.

At 38 is a housing element that is bolted to the frame member or element 12 in the position shown in Figs. 1 and 2 so as to house the pulley 26 and drive belt 25, and at 39 is a second housing element that is also bolted to the frame member or element 12 and fits against the first mentioned housing element 38 so as to form a closure for the space intermediate the frame member or element 12 and the traction wheel 10 so as to protect the driving parts of the machine from any dirt, cut grass or weeds and the like, from becoming entangled in the working parts of the machine and interfering with the power drive mechanism.

The tension of the V-belt 25 may be increased or decreased by screwing the nuts 17—21, 17—22 up or down on the rods 18 and 19 so as to swing the plate 16 up or down and thereby move the motor up or down to tighten or loosen the V-belt 25.

At 40 is shown the usual handle and at 41 is shown the usual brackets attached to the handle 40 and the frame members such as 12 and 13 of the machine, whereby the machine may be pushed or guided. At 42 is shown the customary roller support for the rear portion of the machine which is mounted on brackets 43 that are adjustably mounted on the rear portion of the frame members or elements 12 and 13.

At 44 is shown an electric cord that is wound on supporting hooks 45 and 46 that are rigidly attached to the handle 40. One end of the electric cord 44 is provided with a plug-in element 47 while the other end connects with the electric motor 28.

At 48 is an electric switch that is mounted on the handle 40 and is included in the electric circuit for the control of the electric motor 28 as will readily be understood.

The operation of the device is as follows: The cord 44 may be unwound from the brackets 45 and 46 and the plug 47 may be plugged into any standard electrical convenience outlet or extension appliance. The motor 28 may now be fed current under the control of the switch 48 so that the motor will run. As the motor runs it drives the rotary sickle shaft 23 and rotary sickle blades 23a in the proper direction for cutting purposes and the pinions 29 which are also driven by the shaft 23 in turn drive the cogs 33 in the traction wheels 10 and 11 so that the machine is self propelled, and the operator merely follows the machine and guides it by the handle 40, to make the machine go where he wants it to.

If for any reason the operator desires to pull the machine backwards, he may do so by pressing downwardly on the handle 40, whereupon the machine will be supported on the roller 42 with the machine being tipped upwardly so as to raise the traction wheels 10 and 11 off the ground so that the machine may be easily pulled backwards or pulled in any direction. When the handle 40 is raised again to its normal position the traction wheels 10 and 11 will rest on the ground and they will carry the machine in a forward direction the same as previously described.

Such modifications may be employed as lie within the scope of the appended claim without departing from the spirit and intention of our invention. Now having fully described our invention, we claim:

In a device for converting a manually powered lawn mower to a power driven lawn mower; in combination with a lawn mower having a pair of frame members that are joined together by a rod and a knife support, and being supported on a pair of traction wheels, and having a handle attached thereto for handling the lawn mower, and having a rotary sickle carried on a rotatable shaft mounted in bearings carried by the said frame members; a power unit and a support plate therefor, one edge of said plate being swingably mounted on the said rod and the opposite edge of said plate being held in selected adjusted position on shafts connecting between the plate and the frame members, a pulley, said pulley being rigidly mounted on said rotatable shaft and being positioned intermediate one of said frame elements and the adjacent traction wheel, and flexible means driven by said power unit and engaging said pulley for the rotary driving thereof, a bracket, said bracket being rigidly attached to one of the said frame members and overlapping the said pulley and having an axle element thereon for the traction wheel adjacent said frame member and pulley, and means on said rotatable shaft engaging the said traction wheels for the rotary driving thereof, and means attached to said frame member housing the driving mechanism for the rotary sickle and said traction wheel all as shown and described and for the purposes set forth.

CHARLEY P. O'DELL.
LLOYD W. JONES.